(12) United States Patent
Whitaker

(10) Patent No.: US 10,147,212 B2
(45) Date of Patent: Dec. 4, 2018

(54) METHOD TO CREATE DISPLAY SCREENS FOR A CONTROLLER USED IN A BUILDING AUTOMATION SYSTEM

(71) Applicant: Carrier Corporation, Farmington, CT (US)

(72) Inventor: Ward Whitaker, Kennesaw, GA (US)

(73) Assignee: CARRIER CORPORATION, Farmington, CT (US)

( * ) Notice: Subject to any disclaimer, the term of this patent is extended or adjusted under 35 U.S.C. 154(b) by 264 days.

(21) Appl. No.: 14/830,025

(22) Filed: Aug. 19, 2015

(65) Prior Publication Data
US 2016/0063747 A1 Mar. 3, 2016

Related U.S. Application Data

(60) Provisional application No. 62/043,940, filed on Aug. 29, 2014.

(51) Int. Cl.
| | |
|---|---|
| *G06T 11/00* | (2006.01) |
| *G06T 11/60* | (2006.01) |
| *G06F 3/0488* | (2013.01) |
| *G06F 17/27* | (2006.01) |

(52) U.S. Cl.
CPC ............ *G06T 11/60* (2013.01); *G06F 3/0488* (2013.01); *G06F 17/276* (2013.01)

(58) Field of Classification Search
CPC ...... G06F 17/289; G06F 3/064; G06F 17/212; G06F 17/214; G06F 17/30256; G06F 17/30247; G06F 3/1208; G06K 9/6215; G06T 3/40

See application file for complete search history.

(56) References Cited

U.S. PATENT DOCUMENTS

| | | | |
|---|---|---|---|
| 6,016,142 A | 1/2000 | Chang et al. | |
| 7,174,287 B2 | 2/2007 | Yamada | |
| 7,385,606 B2 | 6/2008 | Everett et al. | |
| 7,395,203 B2 | 7/2008 | Wu et al. | |
| 8,607,141 B2 | 12/2013 | Ryu et al. | |
| 8,761,513 B1 | 6/2014 | Rogowski et al. | |
| 2002/0152063 A1* | 10/2002 | Tokieda | G06F 17/289 704/2 |

(Continued)

FOREIGN PATENT DOCUMENTS

CN 102147790 A 8/2011

*Primary Examiner* — Weiming He
(74) *Attorney, Agent, or Firm* — Cantor Colburn LLP

(57) ABSTRACT

A controller for controlling components in a building automation system including a processor, a display operably coupled to the processor, a memory operably coupled to the processor, and executable software stored in the memory, the executable software operable to display at least one textual element on the display, wherein the at least one textual element is sized based a maximum character parameter. A method of operating a software module configured to create display elements for a controller, the method including operating the module to: create at least one textual element, place at least one character within the at least one textual element to form a word, select at least one support language for the at least one textual element, determine a maximum character parameter, and size the at least one textual element based at least in part on the maximum character parameter.

16 Claims, 2 Drawing Sheets

(56) References Cited

U.S. PATENT DOCUMENTS

| | | |
|---|---|---|
| 2004/0109020 A1 | 6/2004 | Song |
| 2005/0071753 A1 | 3/2005 | Klein et al. |
| 2006/0181532 A1 | 8/2006 | Ravindra et al. |
| 2007/0124675 A1 | 5/2007 | Ban et al. |
| 2009/0313571 A1 | 12/2009 | Horodezky |
| 2011/0087955 A1 | 4/2011 | Ho et al. |
| 2011/0219335 A1 | 9/2011 | Powers |
| 2012/0124469 A1 | 5/2012 | Nakajima et al. |
| 2013/0007603 A1* | 1/2013 | Dougherty ............. G06T 11/60 715/251 |
| 2013/0143183 A1 | 6/2013 | Zilberman |

* cited by examiner

METHOD TO CREATE DISPLAY SCREENS FOR A CONTROLLER USED IN A BUILDING AUTOMATION SYSTEM

CROSS REFERENCE TO RELATED APPLICATIONS

The present application is related to, and claims the priority benefit of, U.S. Provisional Patent Application Ser. No. 62/043,940 filed Aug. 29, 2014, the contents of which are hereby incorporated in their entirety into the present disclosure.

TECHNICAL FIELD OF THE DISCLOSED EMBODIMENTS

The presently disclosed embodiments generally relate to building automation systems, and more particularly, to a method to create display screens for a controller used in a building automation system.

BACKGROUND OF THE DISCLOSED EMBODIMENTS

Generally, building automation systems operate to regulate building climate within a specified range, operate lighting based on occupancy, monitor performance, and device failures, etc. Building automation system interface controllers come in a range of sizes and capabilities to control devices commonly found in buildings. Moreover, these controllers are capable of supporting control capabilities in multiple languages, based on customer preference.

SUMMARY OF THE DISCLOSED EMBODIMENTS

In one aspect, a controller used in connection with building automation systems is provided. The controller includes a processor, a memory operably coupled to the processor, and a display operably coupled to the processor. In one embodiment, the display includes a touchscreen display.

The controller further includes executable software stored in memory, wherein the executable software is operable to display at least one textual element on the display. The at least one textual element includes at least one character placed therein to form a word. The word placed within the at least one textual element may be displayed in a plurality of languages to create a maximum character parameter, based upon which language translation contains the maximum number of characters. The executable software is operable to size the at least one textual element based at least in part on the maximum character parameter.

In one embodiment, the executable software is further operable to display at least one graphical element on the display. As the at least one graphical element is displayed on the screen, a textual element may be placed adjacent to the graphical element.

In one aspect, a method of operating a software module to create display elements for a controller is provided. The method includes the steps of: operating the module to create at least one textual element; operating the module to place at least one character within the at least one textual element to form a word; operating the module to select at least one support language for the at least one textual element; operating the module to determine a maximum character parameter; and operating the module to size the at least one textual element based at least in part on the maximum character parameter.

In one embodiment, the module determines the maximum character parameter based at least in part on the number of characters within the word placed in the at least one textual element and the selected at least one support language.

In one embodiment, the method further includes the step of operating the module to place the at least one textual element in a desired location. In one embodiment, the method further includes the step of creating at least one graphical element. In one embodiment, the method further includes the step of operating the module to place the at least one graphical element in a desired location. In one embodiment, the method further includes the step of operating the module to transfer the at least one textual element to the memory of the controller. In one embodiment, the method further includes the step of operating the module to transfer the at least one graphical element to the memory of the controller.

In one aspect, a display system is provided. The display system includes a display configured to display textual elements, a processor to control the display to display the textual elements. The processor is configurable to control the display to display the textual elements in a plurality of different languages; to graphically predetermine where the textual elements are to be displayed on the display; and to automatically size the text elements based on the plurality of different languages when graphically predetermining where the textual elements are to be displayed on the display.

In one embodiment, the processor is further configurable to automatically size the textual elements based on a maximum character count of text to be displayed in the textual elements. In one embodiment, the maximum character count is determined based on the plurality of different languages. In one embodiment, the plurality of languages is a subset of available languages.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
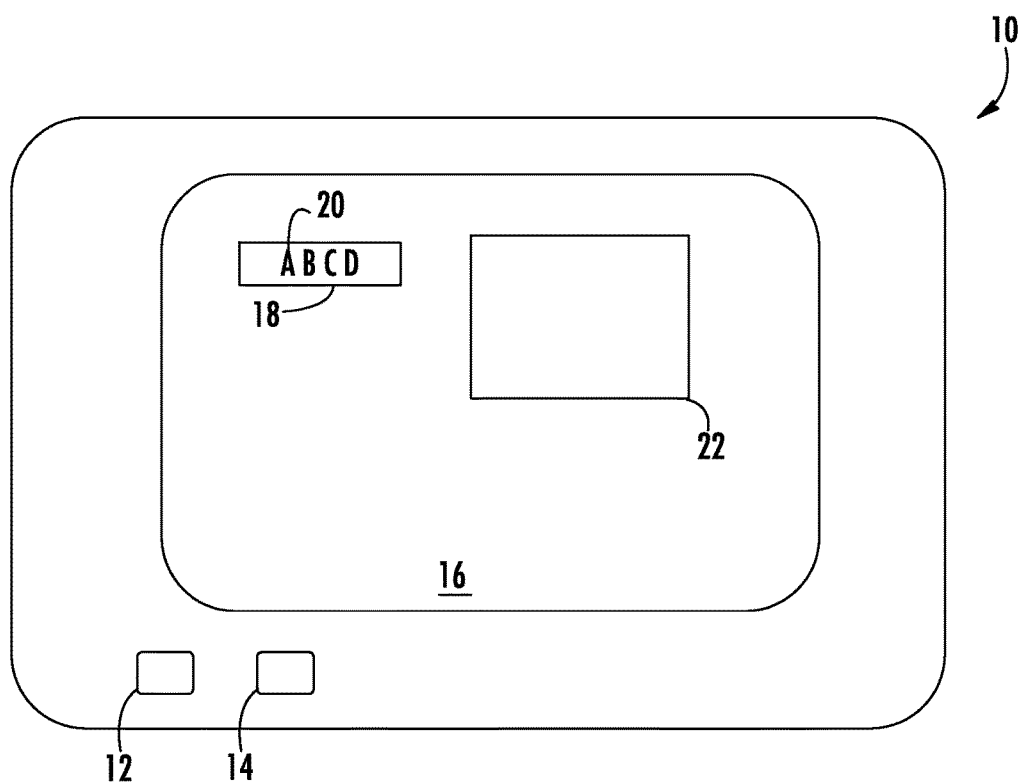
FIG. 1 illustrates a schematic diagram of a controller used in a building automation system.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Generally, software screens for the controller place text fields in fixed positions. A word placed in text field may contain a different number of characters, based on the language chosen. If the text field is not properly placed on the screen, the text field may overlap other elements on the screen, creating an undesirable result for the customer. There is therefore a need for improvements in software screen design for creating fixed positioned text fields that support multiple languages.

FIG. 1 illustrates a controller, generally indicated at 10, used in connection with building automation systems. The controller 10 may be operable to function as an equipment interface, occupant interface, technician interface, temperature sensor, humidity sensor, and a diagnostic tool to name a few non-limiting examples. The controller 10 includes a processor 12, a memory 14, for example read only memory (ROM) and electrically erasable programmable read only memory (EEPROM) to name two non-limiting examples, operably coupled to the processor 12, and a display 16, for example a liquid crystal display (LCD) to name one non-limiting example, operably coupled to the processor 12. In one embodiment, the display 16 includes a touchscreen display.

The controller 10 further includes executable software stored in memory 14, wherein the executable software is operable to display at least one textual element 18 on the display 16. The at least one textual element 18 includes at least one character 20 placed therein to form a word. For example, the characters 20 to form the word "water" may be placed in the at least one textual element 18. The word placed within the at least one textual element 18 may be displayed in a plurality of languages to create a maximum character parameter, based upon which language translation contains the maximum number of characters. For example, the word "water" displayed in English may also be displayed as "wasser" in German, "eau" in French, "agua" in Spanish, "acqua" Italian, or "水" in Japanese to name a few non-limiting examples. Based on this example, the executable software will create a maximum character parameter of six (6), as the German translation "wasser" includes the most characters 20. The executable software is operable to size the at least one textual element 18 based at least in part on the maximum character parameter. Continuing with the previous example, the executable software will size the at least one textual element 18 based on the maximum character parameter six (6). As the at least one textual element 18 is shown on the display 16, it will account for spacing to accommodate six (6) characters 20; therefore, whether the word is displayed in English, German, or Japanese, enough spacing is available to display the word.

In one embodiment, the executable software is further operable to display at least one graphical element 22 on the display 16. As the at least one graphical element 22 is displayed on the screen, a textual element 18 may be placed adjacent to the graphical element 22. Because the textual element 18 is sized based on the maximum character parameter, the textual element 18 may be placed adjacent to a graphical element 22, or another textual element 18 such that the elements do not overlap.

Figure 2:
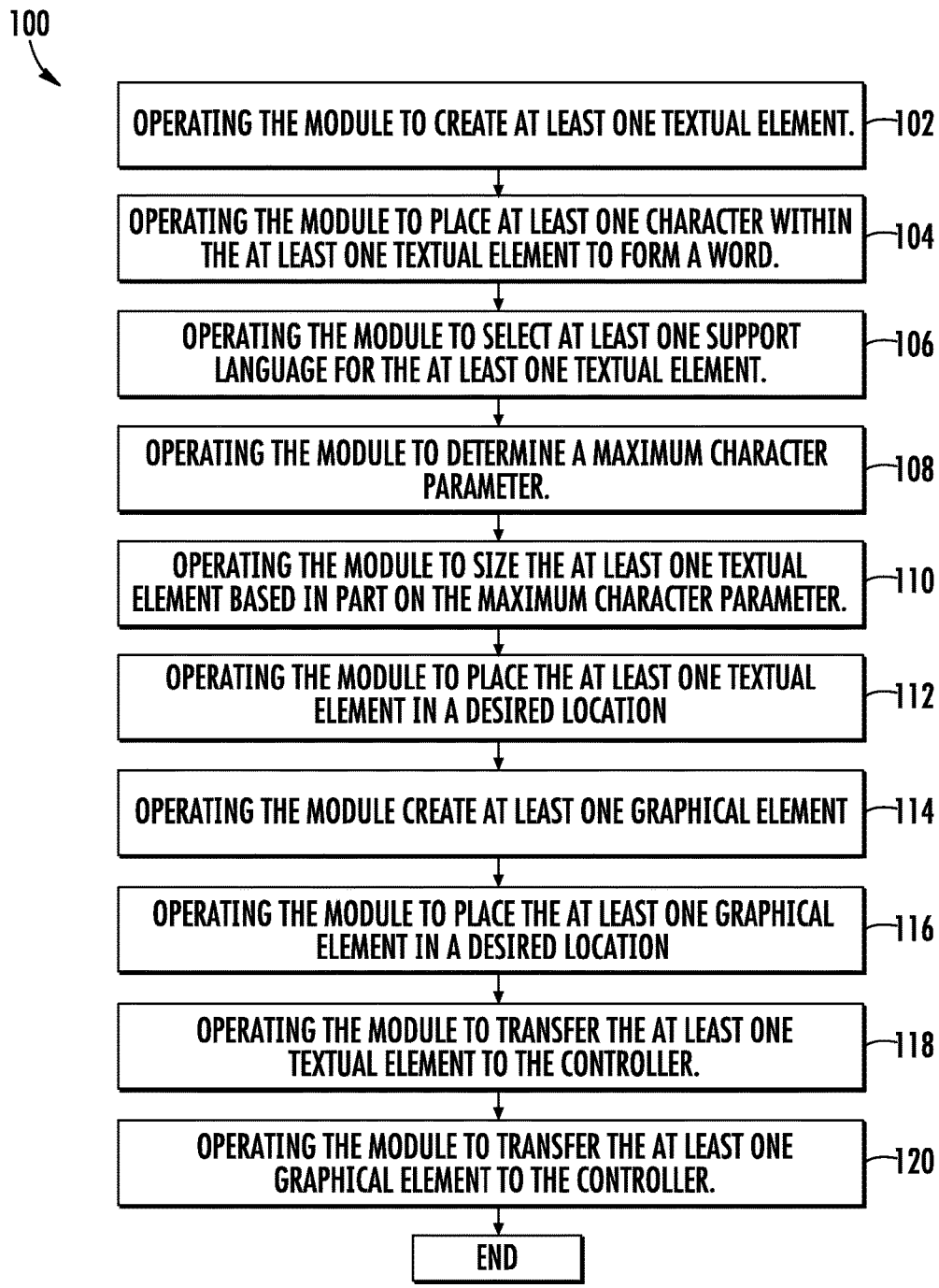
FIG. 2 illustrates a schematic flow diagram of a method to create display screens for a controller used in a building automation system.

FIG. 2 illustrates an exemplary method 100 of operating a software module to create display elements for the controller 10, the method 100 includes step 102 of operating the module to create at least one textual element 18. For example, a user operates a software module within a software package such as Automated Logic's WebCTRL® web-based building automation program to create numerous screens to be used by controller 10 to manage the building automation functions. Part of the screen building process includes creating at least one textual element 18 to be placed on the display 16.

The method 100 further includes the step 104 of operating the module to place at least one character 20 within the at least one textual element 18 to form a word. The user may enter any number of characters 20 within the textual element 18 to form a word. For example, the user may enter the characters 20 to form the English word "instructions."

The method 100 further includes the step 106 of operating the module to select at least one support language for the at least one textual element 18. As the user creates the textual elements 18 to be displayed within the controller 10, the user then selects the different languages that the controller 10 will support. For instance, the user may select English, Spanish and Italian as support languages to name a few non-limiting examples.

The method 100 further includes the step 108 of operating the module to determine a maximum character parameter. In one embodiment, the module determines the maximum character parameter based at least in part on the number of characters within the word placed in the at least one textual element 18 and the selected at least one support language. For example, if the word "instructions" were entered into the textual element 18 and the support languages chosen were English, Spanish and Italian, the software module determines that the English word contains thirteen (13) characters, the Spanish equivalent would be "instrucciones" containing thirteen (13) characters, and the Italian equivalent would be "istruzione," containing ten (10) characters. As a result, the software module determines that the maximum character parameter for the textual element containing the English word "instructions" with support languages in Spanish and Italian is thirteen (13).

The method 100 further includes the step 110 of operating the module to size the at least one textual element 18 based at least in part on the maximum character parameter. For example, based on the "instructions" example above, the at least one textual element 18 is sized to accommodate thirteen (13) characters. It will be appreciated that even if Italian is ultimately chosen as the language used in the controller 10, the textual element 18 will still accommodate thirteen (13) characters.

In one embodiment, the method 100 further includes the step 112 of operating the software module to place the at least one textual element 18 in a desired location. As the user is configuring screens to be displayed on controller 10 to operate a building automation system, the user may select a suitable location for the at least one textual element 18 based on customer preference or any relevant design criteria.

In one embodiment, the method 100 further includes the step 114 of creating at least one graphical element 22. It will be appreciated that the at least one graphical element 22 may consists of a representative button, toggle switch, image, and icon to name a few non-limiting examples.

In one embodiment, the method 100 further includes the step 116 of operating the module to place the at least one graphical element 22 in a desired location. For example, a textual element 18 may be placed next to a graphical element 22 as a reference designation, or provide a word that describes the graphical element 22. Alternatively, two textual elements 18 may be placed adjacent to one another depending on customer preference or design criteria. It will be appreciated that any number of textual elements 18 and graphical elements 22 may be placed adjacent to each other.

In one embodiment, the method 100 further includes the step 118 of operating the module to transfer the at least one textual element 18 to the memory 14 of the controller 10. In one embodiment, the method 100 further includes the step 120 of operating the module to transfer the at least one graphical element 22 to the memory 14 of the controller 10. After each of the textual elements 18 and/or graphical elements 22 are placed in the desired locations in the module, the module transfers the elements to the memory 14 of the controller 10 in order for the processor 12 to place the textual elements 18 and/or graphical elements 22 on the display 16. It will be appreciated that the at least one textual element 18 and the at least one graphical element 22 may be transferred simultaneously.

It will therefore be appreciated that the at least one textual elements 18 are sized based on a maximum character parameter in order to prevent the at least one textual element 18 from overlapping a graphical element 22 or another textual element 18.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A controller for controlling components in a building automation system comprising
   a processor;
   a display operably coupled to the processor;
   a memory operably coupled to the processor; and
   executable software stored in the memory, the executable software operable to display at least one textual element on the display;
   wherein the at least one textual element comprises a plurality of characters placed therein to form a word;
   wherein the word may be displayed in a plurality of languages, the executable software operable to create a maximum character parameter based upon which language translation contains the maximum number of characters for the word;
   wherein the at least one textual element is sized based at least in part on the maximum character parameter.

2. The controller of claim 1, wherein the display comprises a touchscreen display.

3. The controller of claim 1, wherein the executable software is operable to display at least one graphical element.

4. The controller of claim 3, wherein the at least one textual element is displayed adjacent to the at least one graphical element.

5. The controller of claim 1, wherein a first textual element is displayed adjacent a second textual element.

6. A method of operating a software module configured to create display elements for a controller including a processor, a display operably coupled to the processor, and a memory operably coupled to the processor, the method comprising:
   operating the module to create at least one textual element;
   operating the module to place a plurality of characters within the at least one textual element to form a word;
   operating the module to select at least one support language for the at least one textual element;
   operating the module to determine a maximum character parameter based upon which language translation contains the maximum number of characters for the word;
   operating the module to size the at least one textual element based at least in part on the maximum character parameter; and
   operating the module to place the at least one textual element on the display.

7. The method of claim 6, wherein the module determines the maximum character parameter based at least in part on the word placed in the at least one textual element and the at least one support language selected.

8. The method of claim 6, further comprising operating the module to place the at least one textual element in a desired location.

9. The method of claim 8, further comprising operating the module to create at least one graphical element.

10. The method of claim 9 further comprising operating the module to place the at least one graphical element in a desired location.

11. The method of claim 10, further comprising operating the module to transfer the at least one graphical element to the controller.

12. The method of claim 8, further comprising operating the module to transfer the at least one textual element to the controller.

13. A display system, comprising:
   a display, configured to display textual elements;
   a processor to control the display to display the textual elements; wherein the processor is configurable,
   to control the display to display the textual elements in a plurality of different languages, the display comprising a plurality of characters within at least one textual element to form a word,
   to graphically predetermine where the textual elements are to be displayed on the display, and
   to automatically size the text elements based on the plurality of different languages when graphically predetermining where the textual elements are to be displayed on the display based upon which language translation contains the maximum number of characters for the word.

14. The display system of claim 13, wherein the processor is configurable to automatically size the textual elements based on a maximum character count of text to be displayed in the textual elements.

15. The display system of claim 14, wherein the maximum character count is determined based on the plurality of different languages.

16. The display system of claim 15, wherein the plurality of languages is a subset of available languages.

* * * * *